United States Patent [19]

Vollmuth et al.

[11] Patent Number: 4,592,574
[45] Date of Patent: Jun. 3, 1986

[54] CONDUIT COUPLING ASSEMBLY AND METHOD OF USE

[75] Inventors: Lawrence P. Vollmuth, Wheaton; Robert J. Porthan, Mokena, both of Ill.

[73] Assignee: Allied Tube & Conduit Corporation, Harvey, Ill.

[21] Appl. No.: 555,480

[22] Filed: Nov. 28, 1983

[51] Int. Cl.⁴ ............................................. F16L 19/00
[52] U.S. Cl. ...................................... 285/31; 285/355; 285/388; 285/915; 29/434
[58] Field of Search ................. 285/31, 32, DIG. 16, 285/379, 355, 388; 29/434

[56] References Cited

U.S. PATENT DOCUMENTS

| 675,320 | 5/1901 | Boyne | 285/32 |
| 1,036,684 | 8/1912 | Mueller | 285/32 X |
| 1,119,752 | 12/1914 | Goethner et al. | |
| 1,270,021 | 6/1918 | Delehanty | |
| 2,445,963 | 7/1948 | Montgomery | 285/379 X |
| 2,711,171 | 6/1955 | Dunnican | 285/DIG. 16 |
| 2,857,176 | 10/1958 | McTaggart et al. | 285/158 |
| 3,218,096 | 11/1965 | Press | 285/332.1 |
| 3,984,130 | 10/1976 | Berger et al. | 285/31 |
| 4,082,319 | 4/1978 | Berger et al. | 285/27 |
| 4,258,936 | 3/1981 | Goldberg | 285/31 |

FOREIGN PATENT DOCUMENTS 870756 3/1942 France ................................. 285/31
10085 of 1896 United Kingdom .

Primary Examiner—Dave W. Arola
Attorney, Agent, or Firm—Fitch, Even, Tabin & Flannery

[57] ABSTRACT

A conduit coupling assembly for connecting the end portions of two lengths of conduit in coaxial, abutting relationship. The coupling assembly includes an abutment ring, an outer coupling, retainer means and resilient means. The ring has an internal thread sized for threading onto the end portion of one of the lengths of conduit. The coupling has a first end and a second end with a bore extending therebetween sized to slidably, rotatably receive the abutment ring. The coupling first end has an inside dimension smaller than an outside dimension of the ring so that the ring is unable to move past the first end, and the first end is provided with an internal thread sized for threading onto the ends of the lengths of conduit. The retainer means is carried by the outer coupling adjacent its second end for preventing escape of the ring from the bore. The resilient means is disposed between the abutment ring and the coupling first end and serves as a one way coupling device to install the ring on one length of conduit.

10 Claims, 4 Drawing Figures

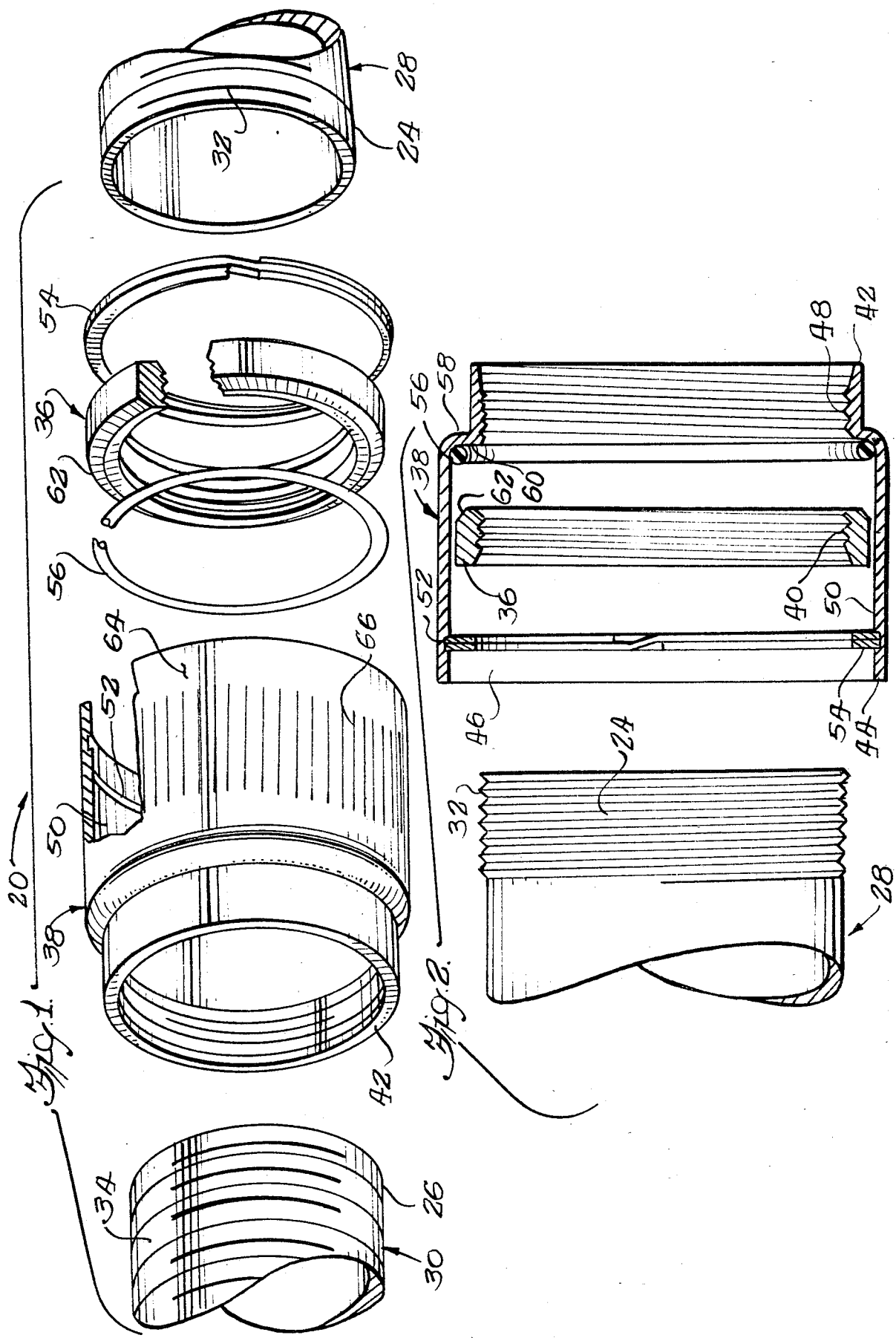

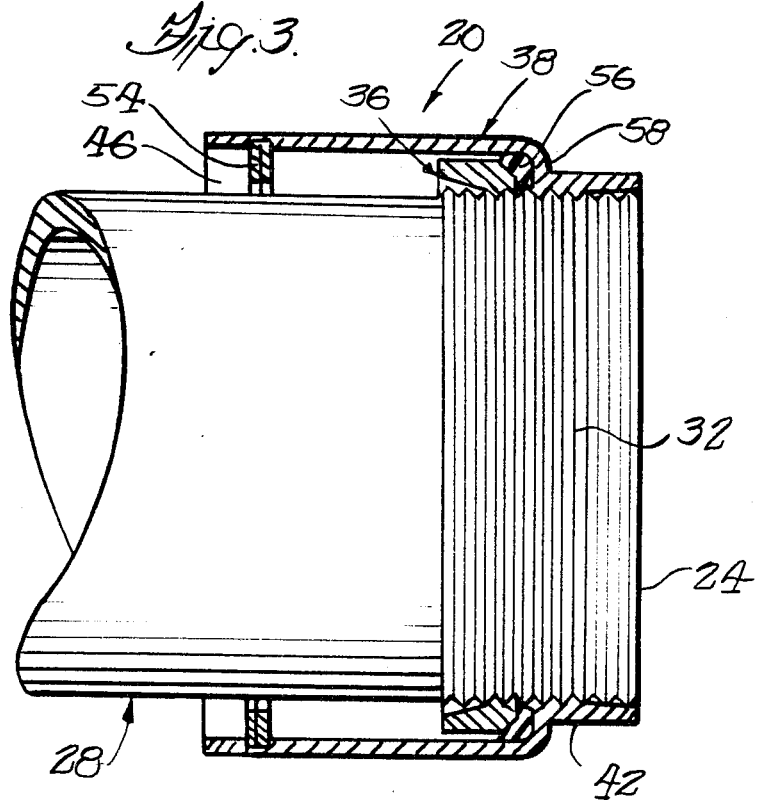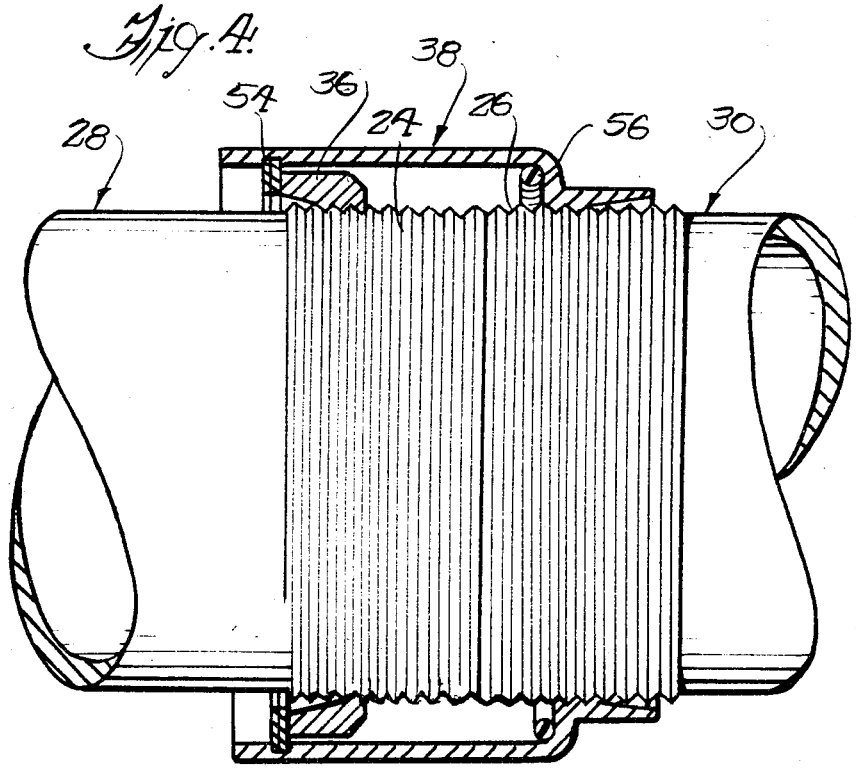

CONDUIT COUPLING ASSEMBLY AND METHOD OF USE

BACKGROUND OF THE INVENTION

The present invention relates to couplings for conduits and pipes and, more specifically, to a coupling assembly for joining the threaded ends of a pair of lengths of conduit in coaxial, abutting relationship.

It is a conventional practice in many types of pipe or conduit systems, and particularly in electrical systems employing tubular conduits, to connect a number of lengths of conduit in end-to-end relation through means of couplings so as to form a continuous conduit system as necessary for a particular application. In the case of thin wall conduit, which is primarily employed for encasing electrical cable or conductor wires in applications where the conduit will not be subjected to large stresses, compression fittings or set screw couplings may be employed. The conduit is generally available in different lengths, commonly 10 and 20 foot lengths, and may be quite readily formed to various bend contours and coupled end-to-end through the compression couplings or set screw couplings.

Another type of conduit which is particularly useful in commercial and industrial applications is generally termed rigid pipe or conduit. Such conduit may, for example, range up to 2½ inches or greater in outer diameter and may have a wall thickness of 0.100 inch or greater which facilitates forming of external threads on the opposite ends of each length of conduit to enable their connection in end-to-end relation. As with thin wall conduits, the rigid pipe or conduit is also conventionally made in lengths of up to 10 to 20 feet long. Due to their relative weight, the rigid pipe lengths are not as readily manipulated during installation and are frequently installed where access is relatively limited so that rotation of the individual lengths, may be quite difficult, if not impossible.

One known technique for connecting lengths of rigid pipe or conduit in end-to-end relation is to provide generally V-shaped external pipe threads of standard size on the opposite ends of each length or section of conduit and then connect the desired number of conduit lengths in end-to-end relation through couplings having internal pipe threads therein which enable threaded connection with adjacent ends of conduit to form a structurally sound connection or coupling. A major drawback in this technique is that the coupling must be threaded onto one conduit section or length followed by relative movement between this conduit section and the conduit section to which it is to be coupled so that the conduit sections are in axial alignment. This generally requires relative longitudinal movement between adjacent conduit sections with simultaneous relative rotation therebetween to effect threaded engagement between the second conduit section and the coupling. Should the need subsequently arise to replace an intermediate section or length of conduit, either a length of the conduit or one or more couplings, or both the conduit and the couplings, must be destroyed in order to effect disassembly.

One recently proposed conduit coupling assembly permits lengths of conduit to be joined quickly. Furthermore, if replacement of a component of a completed system should be required, the coupling assembly allows disassembly of the system without adjacent lengths of conduit undergoing substantial relative longitudinal movement and without any need to rotate one of the lengths of conduit. This coupling assembly includes an outer coupling having ends and a bore extending therebetween for slidably, rotatably retaining an inner abutment ring having an inner thread so that the ring can be threaded onto the end portion of one of the lengths of conduit. This threading is accomplished by using the outer coupling as, in effect, a wrench. The abutment ring has a special annular lip having a slot for receiving the inward extension of a set screw received in a threaded aperture through the outer coupling. After installation of the abutment ring, the set screw is removed or adjusted so as not to interfere with sliding of the outer coupling relative to the abutment ring. It will be appreciated that this coupling system requires specially manufactured components and requires threading and unthreading of the set screw. For a more complete description of this coupling assembly and its operation, reference may be made to commonly assigned U.S. Pat. No. 4,258,936 to Goldberg.

SUMMARY OF THE INVENTION

Among the several objects of the present invention may be noted the provision of an improved coupling assembly: the provision of such coupling assembly which allows lengths of conduit to be quickly joined without their relative rotation; the provision of such coupling assembly which permits convenient partial disassembly of a conduit system without substantial relative longitudinal movement of adjacent lengths of conduit; the provision of such coupling assembly which uses easily manufactured components; the provision of such coupling assembly which avoids the use of a set screw but still allows the outer coupling to be used as a wrench to install an abutment ring; the provision of such coupling assembly which can be installed on a length of conduit in the field without the use of tools and which allows connection of conduit lengths by merely rotating the outer coupling; and the provision of such coupling assembly which has long service life and is reliable in use. Other objects and features of the present invention will be in part apparent and in part pointed out hereinafter in the specification and attendant claims.

Briefly, the conduit coupling assembly of the present invention includes an abutment ring having an internal thread sized for threading onto the end portion of one of a pair of lengths of conduit. An outer coupling is provided having a first end and a second end and a bore extending therebetween sized to slidably, rotatably receive the abutment ring. The coupling first end has an inside dimension smaller than an outside dimension of the ring so that the ring is unable to move past the first end, and the first end has an internal thread sized for threading onto the conduit end portions. The assembly also includes retainer means carried by the outer coupling adjacent its second end for preventing escape of the abutment ring from the bore. Finally, resilient means are provided disposed between the abutment ring and the coupling first end to serve as a one way coupling device for installation of the ring on one length of conduit.

BRIEF DESCRIPTION OF THE DRAWINGS

FIG. 1 is an exploded perspective of the coupling assembly of the present invention for joining the threaded ends of two lengths of conduit;

FIG. 2 is a sectional view showing an abutment ring retained in an outer coupling of the coupling assembly between a threaded end of the coupling and a retainer held by the coupling, with resilient means disposed between the abutment ring and the threaded coupling end;

FIG. 3, similar to FIG. 2, illustrates the outer coupling being installed on one length of conduit with the resilient means compressed; and FIG. 4, also similar to FIG. 2, depicts the coupling assembly connecting the two lengths of conduit in coaxial abutting relationship.

Corresponding reference characters indicate corresponding parts throughout the several views of the drawings.

DESCRIPTION OF THE PREFERRED EMBODIMENT

Referring now to the drawings, a coupling assembly of the present invention for connecting the end portions 24, 26 of a pair of lengths of conduit 28, 30, respectively, is designated generally by reference character 20. Each conduit end portion has an external thread 32, 34 of the same size. The coupling assembly 20 comprises an abutment ring 36 for positioning on the end portion of one of the lengths of conduit; an outer coupling 38 for holding the abutment ring 36, retainer means carried by coupling 38 for preventing the abutment ring from escaping from the outer coupling, and resilient means for use in mounting the abutment ring on the end portion of one of the lengths of conduit.

More specifically, the abutment ring 36 has an internal thread 40 sized for threading onto end portion 24 of conduit length 28. The outer coupling 38 has a first end 42 and a second end 44 with a bore 46 extending therebetween and sized to slidably, rotatably receive the abutment ring 36. The coupling first end 42 has an inside dimension smaller than an outside dimension of the abutment ring so that the ring is unable to move past the coupling first end, and the coupling first end has an internal thread 48 sized for threading onto the end portions 24, 26 of the respective conduit lengths. Preferably abutment ring 36 has sufficient length that it cannot rotate transversely to the axis of the outer coupling 38 when the ring 36 is disposed in bore 46. The outer coupling 38 has an inner surface 50 defining the bore 46 with the inner surface having an annular groove 52 disposed adjacent the coupling second end 44. The groove 52 serves to seat a snap ring 54 which has an inside dimension smaller than the outside dimension of the abutment ring 36 to prevent escape of the ring from bore 46. The snap ring 54 thus constitutes the aforementioned retainer means.

Held by the outer coupling 38 between the abutment ring 36 and coupling first end 42 is an O-ring 56, preferably formed of rubber, which constitutes the aforementioned resilient means for use in mounting the ring 36 on the end portion 24 of the length of conduit 28. As abutment ring 36 and snap ring 54 are made of steel they can easily slide on one another and can be considered to have a relatively low coefficient of friction. On the other hand, when the abutment ring 36 compresses O-ring 56, the two exhibit a relatively high coefficient of friction. The outer coupling 38 has an annular interior shoulder 58 and the shoulder and the abutment ring 36 have facing surfaces 60, 62 respectively, for compressing the O-ring 56 therebetween. More specifically, in the installed condition of ring 36, surface 62 extends at a 45° angle to the axis of the coupling assembly. Surface 60 includes the arcuate interior surface formed at the merger of the first end 42 with the remainder of coupling 38, as well as the extension thereof to the thread 48 of the first end 42. The ends of the threads on the outer coupling and the abutment ring are preferably chamfered to function as guides for directing entrance of the end portion of a length of conduit.

The outer coupling 38 has an outside surface 64 provided with a knurled portion 66 to increase the installer's grip when the outer coupling is used as, in effect, a wrench for installing the abutment ring 36 on the end portion 24 of conduit length 28. More specifically, conduit end portion 24 is inserted through coupling second end 44 until it drives the abutment ring 36 toward interior shoulder 58 with the O-ring 56 disposed therebetween. Due to the high coefficient of friction between the O-ring and the abutment ring, rotation of the outer coupling 38 results in threading of the abutment ring onto conduit end portion 24. Continued rotation of the coupling causes the abutment ring to be forced further onto the thread of the end portion 24 and the end portion to be threaded onto the coupling internal thread 48 at the first end 42 of the coupling. The high coefficient of friction provided by the O-ring prevents substantial relative rotation between the abutment ring and coupling during their threading onto the length of conduit 28. As continued rotation of abutment ring 36 is interfered with due to its reaching the extent of the thread on conduit end portion 24, the abutment ring slides against the O-ring causing the abutment ring to move closer to shoulder 58 resulting in compression of the O-ring therebetween. With the O-ring fully compressed, further rotation of the outer coupling causes the threads of the abutment ring to become firmly locked on conduit end portion 24. This occurs because the high coefficient of friction provided by the fully compressed O-ring prevents substantial rotation between the outer coupling and the abutment ring. The length of the threaded end conduit portion 24 is chosen so that with the O-ring compressed and the abutment ring installed, conduit 28 and outer coupling 38 terminate substantially flush.

Operation of the coupling assembly 20 of the present invention is as follows: The coupling assembly 20 can be easily and quickly assembled at the factory without the use of any but the simplest hand tools, and they are needed only to urge snap ring 54 into groove 52. The O-ring 56 is cemented into the outer coupling 38 against shoulder 58. After the abutment ring is placed in the coupling bore 46, the snap ring 54 is seated in annular groove 52 to retain the abutment ring 36 in bore 46. As mentioned above, when the O-ring is compressed and the abutment ring is locked onto conduit end portion 24 the ends of conduit length 28 and the coupling assembly are substantially coterminous. Thus length of conduit 30 can be brought into coaxial, abutting alignment with conduit length 28, and unthreading of coupling 38 with respect to conduit end portion 24 results in threading of the coupling first end 42 onto conduit end portion 26 of conduit length 30. It should be appreciated that as the coupling is initially rotated to unthread it from end portion 26, the O-ring recovers from its compressed state allowing relative movement between the abutment ring and the coupling. Thus the O-ring serves as a one-way coupling device to permit convenient installation of the abutment ring 36 on length of conduit 28. As the installer continues to rotate the coupling, the coupling moves the O-ring out of engagement with the abutment ring. Further rotation causes the snap ring 54 to advance until it engages the abutment ring. Because the two rings have a relatively low coefficient of friction, additional rotation of the coupling does not result in unthreading of the abutment ring from end portion 24, but instead results in the conduit end portions 24 and 26 being drawn into firmly abutting contact. It should further be appreciated that a completed coupling assembly 20 can be field-installed on a length of conduit quickly and without the use of any tools.

The coupling assembly 20 offers several advantages over prior art coupling assemblies wherein the outer coupling is formed by casting. The outer coupling 38 of the subject coupling assembly is manufactured from wrought and cold drawn steel. This provides coupling 38 with higher tensile strength properties resulting in greater pull and beam strength. The outside diameter of coupling 38 is also smaller. This compactness benefits the user by reducing the space required to assemble and install conduit. The smaller size results from the higher material strength of the wrought outer coupling which permits a thinner wall. The smaller size also results from the mounting of the abutment ring 36 using the O-ring torquing feature. This feature does not require the provision of any window in the outer coupling nor does it require ears or lugs on the abutment ring, thus reducing the diameter of the abutment ring and thus the diameter of the coupling itself.

No special tool or wrench is required to thread and lock the abutment ring 36 onto the end portion 24 of conduit length 28. Using the rubber O-ring 56, no exterior direct contact is required to thread and lock the sliding abutment ring in place. The torque required to thread the abutment ring onto conduit end portion 24 is transmitted from the outer coupling 38 through the O-ring to the abutment ring. The friction generated by the O-ring between itself and the surfaces 60, 62 of the shoulder 58 and abutment ring 36, respectively, is greater than the friction between the threads of the abutment ring and the threads of end portion 24. This condition causes the abutment ring to turn with the outer coupling and thus thread its way up the length of conduit until the end of the thread 32 on end portion 24 is reached and the abutment ring is locked on the end portion. This frictional condition also prevents relative motion between the abutment ring and the outer coupling which, if it occured, would cause the two to lock against each other on the thread of end portion 24 before the abutment ring had reached the end of the thread on end portion 24 (its lock position).

The compressible and elastic properties of the O-ring establish a cushion between the outer coupling and the abutment ring which can absorb minor variations in thread location and dimension that might otherwise create a bind condition between the outer coupling and end portion 24 during mounting of the abutment ring. With the abutment ring fully threaded and locked onto conduit end portion 24, the O-ring allows the housing to disengage while leaving the sliding ring locked firmly in place on the end portion of the conduit.

As a method of coupling the pair of lengths of conduit using the completed coupling assembly 20, the present invention includes several steps:

(a) The outer coupling 38 is moved to insert end portion 24 of conduit length 28 into the bore from coupling second end 44 until the abutment ring is pushed against the O-ring.

(b) The coupling 38 is rotated until the conduit end portion 24 is threaded through the abutment ring and onto the first end 42 with the O-ring compressed between the abutment ring and the shoulder 58 at the first end of the coupling.

(c) Threaded end portion 26 of length of conduit 30 is moved into axial alignment with conduit length 28.

(d) The outer coupling is threaded onto end portion 26 thereby joining the lengths of conduit.

In view of the above, it will be seen that the several objects of the invention are achieved and other advantageous results obtained.

As various changes could be made in the above constructions without departing from the scope of the invention, it is intended that all matter contained in the above description and shown in the accompaning drawings shall be interpreted as illustrative and not in a limiting sense.

What is claimed is:

1. A conduit coupling assembly for connecting the end portions of a pair of lengths of tubular conduit or the like in coaxial, abutting relationship, said end portions each having external threads of the same size, said coupling assembly comprising:

an abutment ring having an internal thread sized for threading onto the end portion of one of said lengths of conduit;

an outer coupling having a first end and a second end and a bore extending therebetween sized to slidably receive said abutment ring, said coupling first end having an inside dimension smaller than an outside dimension of said ring so that said ring is unable to move past said first end, said first end having an internal thread sized for threading onto said conduit end portions;

retainer means carried by said outer coupling adjacent its second end for preventing escape of said ring from said bore; and resilient means disposed between said abutment ring and said outer coupling first end, said resilient means serving as a one-way coupling device to transmit frictional force from said coupling to said ring to install said ring on one length of conduit, said resilient means disengaging from said ring upon unthreading of said coupling from said one length of conduit, said resilient means being compressed between said coupling first end and said ring when said outer coupling is used to transmit force to install said ring on said one length of conduit and said resilient means returning toward its uncompressed state when said outer coupling is threaded onto the end portion of the other length of conduit, said resilient means being spaced from one of said ring and said first end when said conduits are coupled.

2. A conduit coupling assembly as set forth in claim 1 wherein the thread length of said one conduit end portion is such that, with said outer coupling threaded thereupon so that said resilient means is compressed with said ring at the end of the thread of said one end portion, said outer coupling and said one length of conduit terminate generally flush, so that after alignment of the other length of conduit, unthreading of said coupling with said one length of conduit results in threading of said coupling onto the other length of conduit.

3. A conduit coupling assembly as set forth in claim 1 wherein said resilient means comprises an O-ring.

4. A conduit coupling assembly as set forth in claim 1 wherein said retainer means comprises a snap ring.

5. A conduit coupling assembly as set forth in claim 4 wherein said outer coupling has an inner surface defining said bore, said inner surface having an annular groove disposed adjacent said coupling second end for seating said snap ring.

6. A conduit coupling assembly as set forth in claim 1 wherein said outer coupling has an annular interior shoulder disposed adjacent its first end for engaging said resilient means.

7. A conduit coupling assembly as set forth in claim 6 wherein said shoulder and said abutment ring have facing surfaces for compressing said resilient means therebetween.

8. A coupling assembly as set forth in claim 6 wherein said resilient means is cemented to said interior shoulder.

9. A coupling assembly as set forth in claim 1 wherein said abutment ring has sufficient length that said ring cannot rotate transversely to the axis of said outer coupling when said ring is disposed in said bore.

10. A method of coupling two lengths of conduit each of which has an end portion with an external thread of the same size, to the end portion of one of said lengths of conduit, using a coupling assembly, said coupling assembly including an abutment ring having an internal thread sized for threading onto the end portion of said one of the lengths of conduit, said coupling assembly further comprising an outer coupling having a first end having an internal thread sized for threading onto the threads of said lengths of conduit, and said coupling having a bore slidably receiving said abutment ring, said coupling assembly further comprising resilient means disposed in said bore adjacent said first end and retainer means installed in said bore adjacent a second end of said outer coupling, said method comprising the following steps:

(a) moving said outer coupling to insert said end portion of said one of said lengths of conduit into said bore from said second end until said ring is pushed against said resilient means sufficiently to create a frictional force therebetween large enough to resist relative rotation when said end portion is threaded into said ring;

(b) rotating said outer coupling until said end portion is threaded through said abutment ring and onto said coupling first end with said resilient means compressed between said ring and said first end;

(c) moving the end portion of the other length of conduit into axial alignment with said one length of conduit; and (d) threading said outer coupling onto the end portion of said other length of conduit resulting in said ring becoming spaced from said resilient means and said resilient means returning toward its uncompressed state thereby joining said lengths of conduit.

* * * * *